United States Patent [19]
Chan

[11] Patent Number: 5,883,559
[45] Date of Patent: Mar. 16, 1999

[54] ADJUSTABLE ASYMMETRIC AVAILABLE SATURATION FLUX TRANSFORMER

[75] Inventor: Jiun-Haw Chan, Taipei, Taiwan

[73] Assignee: Ko-Chong Yuan, Taipei, Taiwan

[21] Appl. No.: 920,723

[22] Filed: Aug. 29, 1997

[30] Foreign Application Priority Data

Sep. 6, 1996 [TW] Taiwan ................................ 85213795

[51] Int. Cl.⁶ ........................... H01F 17/60; H01F 21/08
[52] U.S. Cl. ........................ 336/178; 336/212; 336/165
[58] Field of Search ................................. 336/165, 178, 336/234, 212

[56] References Cited

U.S. PATENT DOCUMENTS

| | | | |
|---|---|---|---|
| 4,031,457 | 6/1977 | Oberbeck | 336/178 |
| 4,307,334 | 12/1981 | Peil et al. | 336/172 |
| 4,409,523 | 10/1983 | Yasumura | 336/178 |

*Primary Examiner*—Renee S. Luebke
*Assistant Examiner*—Anh Mai
*Attorney, Agent, or Firm*—Foley & Lardner

[57] ABSTRACT

An adjustable asymmetric available saturation flux transformer for a horizontal deflection circuit of a CRT. The transformer includes a core having an asymmetric form, a linear compensation coil and a magnetic saturation control coil. The linear compensation coil is connected in series with a deflection coil of the horizontal deflection circuit. A current of the linear compensation coil can be adjusted to vary a current of the magnetic saturation control coil, so as to attain different effects of compensation as desired.

15 Claims, 6 Drawing Sheets

ADJUSTABLE ASYMMETRIC AVAILABLE SATURATION FLUX TRANSFORMER

BACKGROUND OF THE INVENTION

1. Field of the Invention

The present invention relates to an adjustable asymmetric available saturation flux transformer, more particularly, to a linear compensation transformer adapted for a horizontal deflection circuit of a cathode-ray tube (CRT), said transformer having a function for modifying left-side lengthened distortion of an image by compensating a deflection current of the deflection circuit. Various compensation conditions can be satisfied by adjusting a magnitude of current applied to the transformer so as to be adapted for various horizontal scan frequencies. Utilizing the transformer in accordance with the present invention, a problem of magnetic-field interference due to a conventional linear compensation transformer can be avoided.

2. Description of Related Art

In a current design for a horizontal deflection circuit of a CRT, a horizontal scan line scans a screen from a left-side to a right-side thereof. Since a deflection current of the deflection circuit has a continuous sawtooth waveform, impedance corresponding to a scan duration occurs exponential distortion, resulting in lengthening of a left-side of an image displayed on a screen. Such distortion can be expressed by an expression as follows:

$$d(\%) = (1/2)ts[(Ry+rs)/Ly] \times 100\%$$

wherein

Ly: inductance of a deflection coil of the deflection circuit ts: scan duration

Ry: impedance of the deflection coil rs: inner impedance of a transistor of the deflection circuit For example, referring to FIG. 3, a circular image 41 in a display region 40 of the screen of the CRT is deformed at the left-side thereof, that is, a lengthened region 42 is generated at the left-side of the image 41. Therefore, the resulting image cannot be exactly circular.

To solve this problem, a conventional method provides a horizontal deflection circuit for a multi-frequency display or CRT, as shown in FIG. 2B. A multi-frequency selecting switch SW automatically switches to select a proper one of a set of anti-saturation coils 60 having different inductive impedances, the selected anti-saturation coil 60 cooperates with the deflection coil 50 of the horizontal deflection circuit to achieve compensation of image horizontal distortion for a certain horizontal scan frequency.

When positive and negative currents flow through the respective anti-saturation coils 60, the coils 60 present different degrees of saturation. To modify the distortion, a proper one of the anti-saturation coils 60 is made to be in a non-saturated state, so as to adjust the magnitude of current passing through the deflection coil 50.

However, utilizing the above construction to perform linear compensation for horizontal deflection requires a quantity of anti-saturation coils 60 to proceed with the compensation of horizontal distortion for various frequencies. Therefore, the construction may be too complicated.

Each of the anti-saturation coils 60 is structured as shown in FIG. 2A. The anti-saturation coil 60 comprises a core 62, a linear compensation coil 61 wound on the core 62, and a permanent magnet 63 combined to an end of the core 62. Such a structure is a "open magnetic loop", that is, there is a problem of magnetic-field interference during operation thereof. The phenomenon of magnetic-field interference intends to influence the CRT, resulting in degradation of color purity and color convergence.

In addition, as the horizontal scan frequency of a display is being increased, the necessary quantity of anti-saturation coils is increased proportionally. Accordingly the problem of magnetic-field interference becomes even more serious, and the manufacturing cost is also increased.

SUMMARY OF THE INVENTION

One object of the present invention is to provide an adjustable asymmetric available saturation flux transformer, which has a simple construction.

Another object of the present invention is to provide an adjustable asymmetric available saturation flux transformer, which can avoid a problem of magnetic-field interference.

In accordance with one aspect of the present invention, the transformer has a core having an asymmetric form, a linear compensation coil and a magnetic saturation control coil wound on opposite sides of the core respectively, the current of the linear compensation coil of the transformer can be adjusted only through only the magnetic saturation control coil of the transformer. That is, the single magnetic saturation control coil can substitute for the conventional design, in which a quantity of anti-saturation coils are utilized, so that the construction of the transformer can be simplified.

In accordance with another aspect of the present invention, the transformer does not utilize a permanent magnet, and presents a "closed magnetic loop", whereby avoiding the phenomenon of magnetic-field interference and the due problems.

Other objects, advantages and novel features of the invention will become more apparent from the following detailed description when taken in conjunction with the accompanying drawings.

DETAILED DESCRIPTION OF PREFERRED EMBODIMENT

Figure 1:
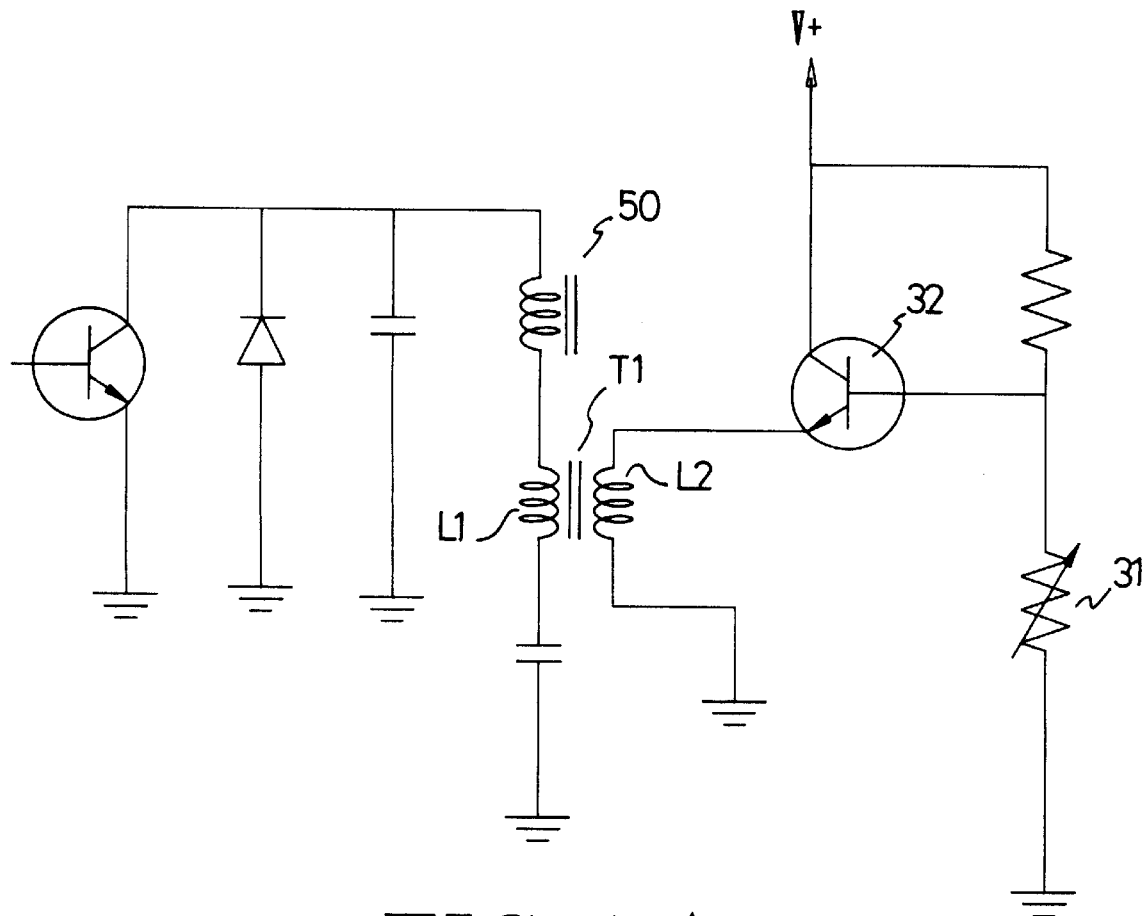
FIG. 1A shows a transformer in accordance with the present invention applied to a horizontal deflection circuit of a CRT.
FIG. 1B shows a waveform of the deflection current of FIG. 1A.
Figure 1:
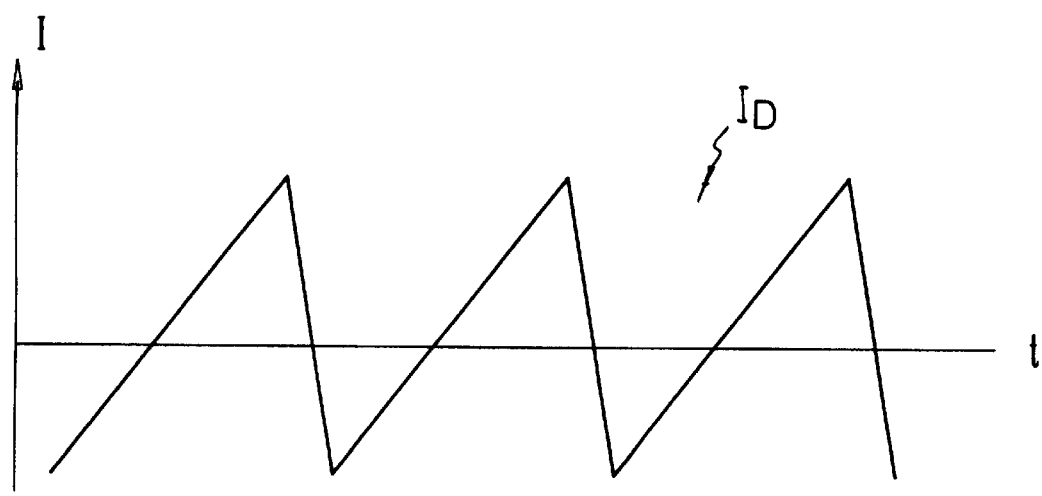
Figure 2A:
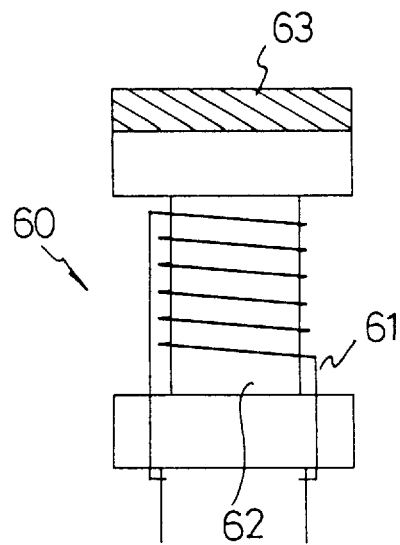
FIG. 2A is a schematic diagram of a conventional anti-saturation coil.
Figure 2B:
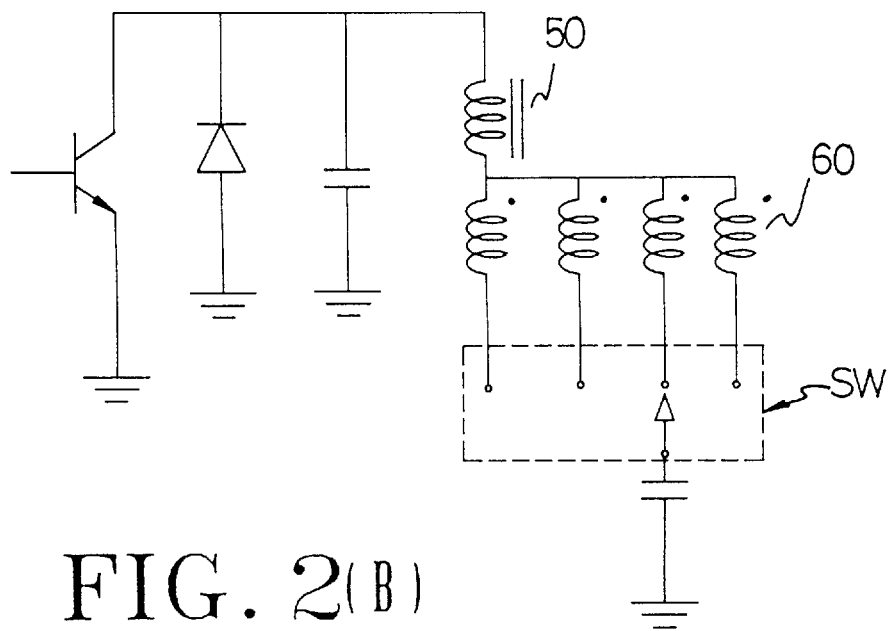
FIG. 2B shows a circuit diagram of a conventional horizontal deflection circuit of a multi-frequency display utilizing a plurality of the anti-saturation coils of FIG. 2A.
Figure 3:
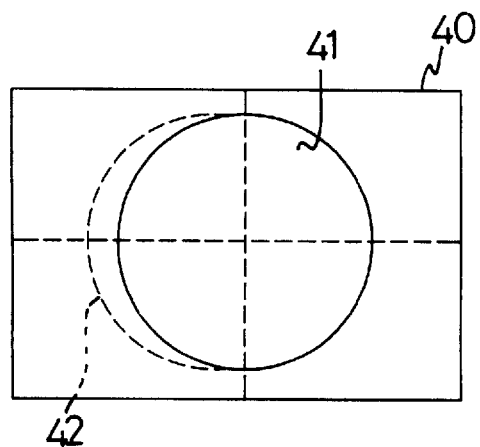
FIG. 3 is a schematic diagram showing a phenomenon of horizontal defection distortion.

Referring to FIG. 1A, a linear compensation transformer T1 in accordance with the present invention is connected in series with the deflection coil 50 of the horizontal deflection circuit of the CRT. FIG. 1B shows the waveform of a deflection current $I_D$ flowing through the deflection coil 50. The linear compensation transformer T1 comprises a linear compensation coil L1 connected in series with the deflection coil 50 and a magnetic saturation control coil L2. A current adjusting circuit composed of a transistor 32 and a variable resistor 31 is connected to the magnetic saturation coil L2 to provide the magnetic saturation coil L2 with a continuous DC voltage.

The current $I_{L1}$ of the linear compensation coil L1 can be adjusted as the magnitude of the current $I_{L2}$ flowing through the magnetic saturation control coil L2 is varied by varying the resistance of the variable resistor 31. Accordingly, when the transformer T1 is applied to the multi-frequency display, the current flowing through the linear compensation coil L1 and hence flowing through the deflection coil 50 can be adjusted by varying the resistance of the variable resistor 31 to achieve different compensating effects for different horizontal scan frequencies. Thus horizontal deflection compensation for various frequency bands can be performed by a single linear compensation transformer T1 without using a plurality of anti-saturation coils.

Furthermore, the linear compensation transformer T1 is not provided with a permanent magnet, and the magnetic loop thereof is a closed magnetic loop. Accordingly, the problem of magnetic-field interference can be avoided.

Figure 4A:
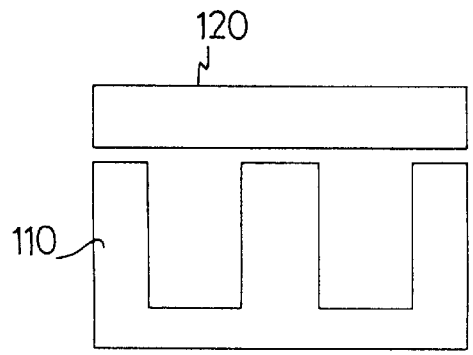
FIG. 4A shows an embodiment of a core of the transformer in accordance with the present invention.
Figure 4B:
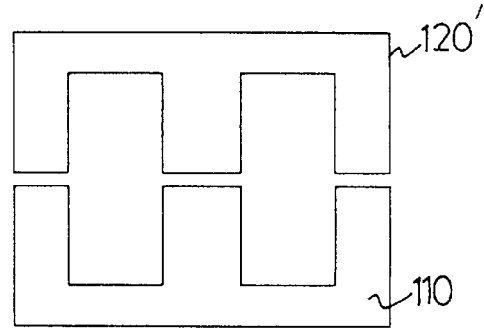
FIG. 4B shows another embodiment of the core of the transformer in accordance the present invention.

Referring to FIGS. 4A and 4B, a core 100 of the transformer T1 in accordance with the present invention can be composed of two portions, one portion 110 has a section appearing as an "E", and the other portion 120 (120') has a section appearing as an inverse "E" or an "I". Hereafter, a core composed of the portion having the section as an "E" and the portion having the section as an "I" is described as an example of the present invention.

Figure 5B:
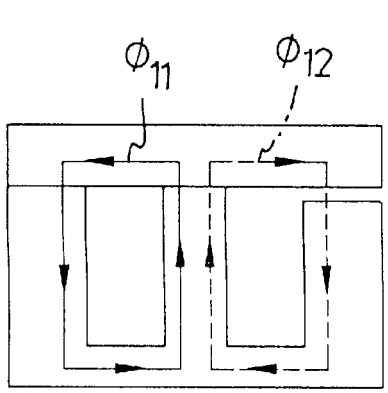
FIG. 5B shows the magnetic loop of FIG. 5A.
Figure 5A:
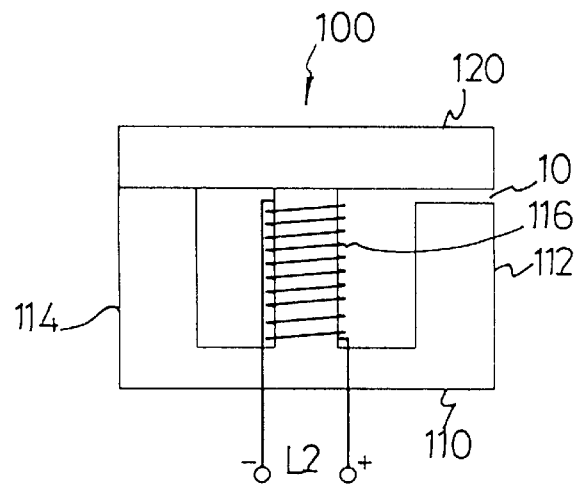
FIG. 5A shows the core in accordance with the present invention provided with a magnetic saturation control coil

Referring to FIG. 5A, in view of a section the core 100, the composed core 100 has an air gap 10 defined between an end 112 of the E-like portion 110 and the I-like portion 120, while there is no gap between an opposite end 114 of the E-like portion 110 and the I-like portion 120, so the core 100 is formed as an asymmetric formation. Since the magnetic resistance of air is larger than that of metal such as iron forming the core 100, the magnetic resistance of the right side of the core 100 is higher than the left side thereof.

The magnetic saturation control coil L2 is wound on an intermediate pole 116 of the core 100, and a DC current $I_{L2}$ is applied thereto, the direction of the current $I_{L2}$ is indicated by the "−" and "+" symbols marked at terminals of the coil L2. The magnetic loop of the core 100 having the magnetic saturation control coil L2 is shown in FIG. 5B.

As shown in FIG. 5B, magnetic flux $\phi_{11}$ and magnetic flux $\phi_{12}$ induced by the coil L2 have opposite flow directions (as indicated by arrows in the drawing) respectively.

Figures 6A, 6B:
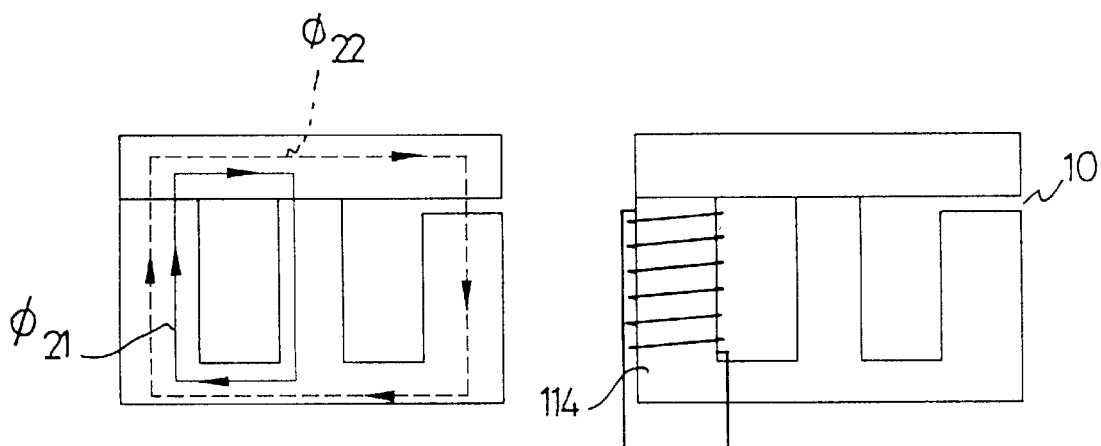
FIG. 6A shows the core in accordance with the present invention provided with a linear compensation coil connected with a current flowing in a first direction.
FIG. 6B shows the magnetic loop of FIG. 6B.

Referring to FIG. 6A, the core 100 is provided with a linear compensation coil L1 wound on the left side 114 thereof having no gap. A current $I_{L1}$ is applied to the linear compensation coil L1, the direction of the current $I_{L1}$ is indicated by the "−" and "+" symbols marked at terminals of the coil L1, that is, the current $I_{L1}$ flows in a positive direction. When the linear compensation coil L1 is applied with the current $I_{L1}$ flowing in the direction as shown in this drawing, the magnetic loop generated in the core 100 is shown in FIG. 6B.

The magnetic flux induced by the coil L1 is divided into $\phi_{21}$ flowing through the intermediate pole 116 and $\phi_{22}$ flowing through the right side 112 of the core 100. As shown in the drawing, the magnetic flux $\phi_{21}$ and magnetic flux $\phi_{22}$ flow in a clockwise direction.

Figures 7A, 7B:
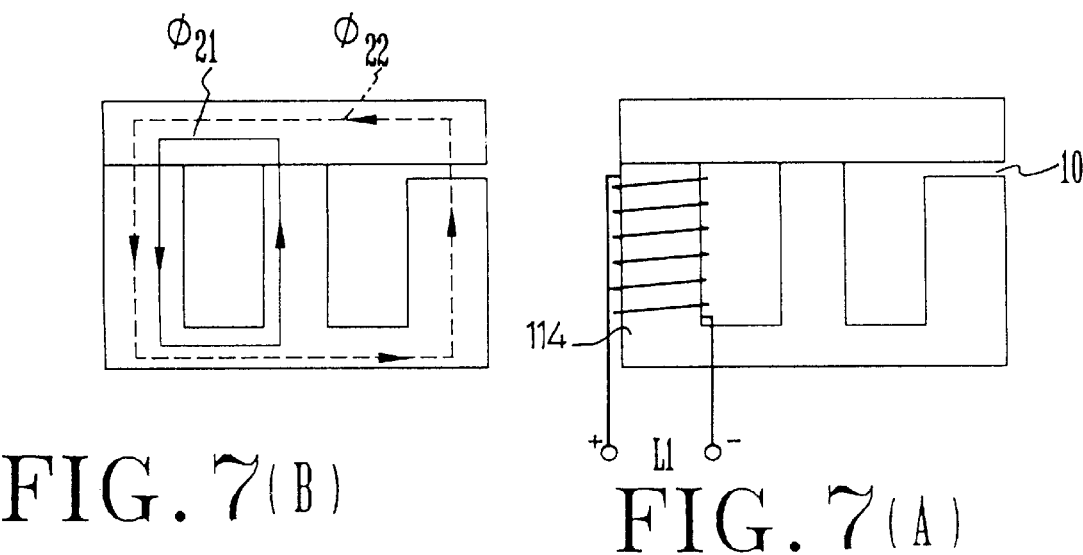
FIG. 7A shows the core in accordance with the present invention provided with the linear compensation coil connected with a current flowing in a second direction reverse to the first direction.
FIG. 7B shows the magnetic loop of FIG. 7A.

When the direction of the current $I_{L1}$ is changed, that is, a negative direction, referring to FIGS. 7A and 7B, the flow directions of the magnetic flux $\phi_{21}$ and flux $\phi_{22}$ are also changed (counter-clockwise in this case).

Figures 8A, 8B:
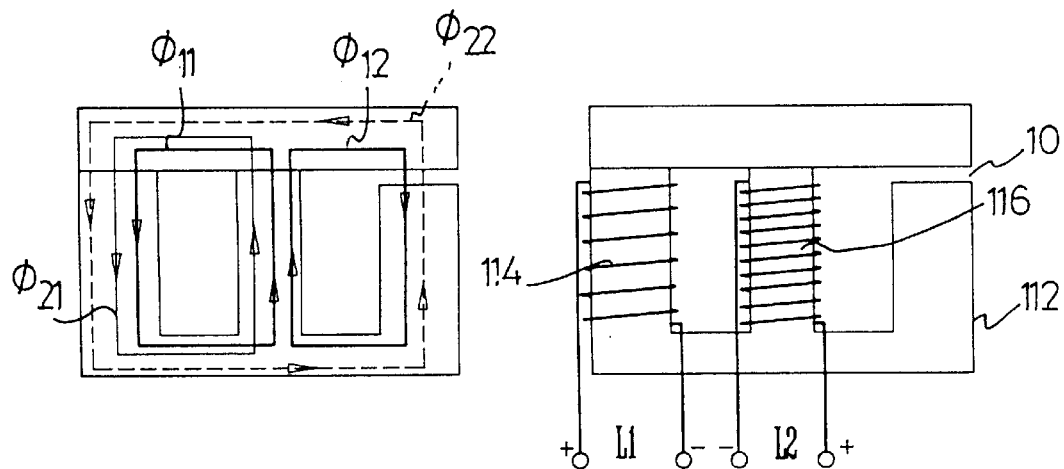
FIG. 8A shows the core in accordance with the present invention provided with the magnetic saturation control coil and the linear compensation coil.
FIG. 8B shows the magnetic loop of FIG. 8A.

Referring to FIGS. 8A and 8B, the core 100 is provided with both the linear compensation coil L1 and the magnetic saturation control coil L2, wherein the current $I_{L1}$ applied to the linear compensation coil L1 flows in the same direction as FIG. 7A (negative). As shown in this drawing, a resultant magnetic flux flowing through the left side 114 of the core 100 is a sum of $\phi_{11}$, $\phi_{21}$ and $\phi_{22}$, while a resultant magnetic flux flowing through the right side 112 having the gap 10 is $\phi_{22}$ minus $\phi_{12}$ since $\phi_{22}$ and $\phi_{12}$ flow in opposite directions.

As mentioned above, the magnetic resistance of the left side of the core 100 is lower than that of the right side thereof, and furthermore, the resultant magnetic flux flowing through the left side of the core 100 is larger than the magnetic flux flowing through the right side thereof. Accordingly, the left side of the core is very easily saturated with only a very small current. In such a case, the linear compensation coil L1 functions as an ordinary resistor.

Figures 9A, 9B:
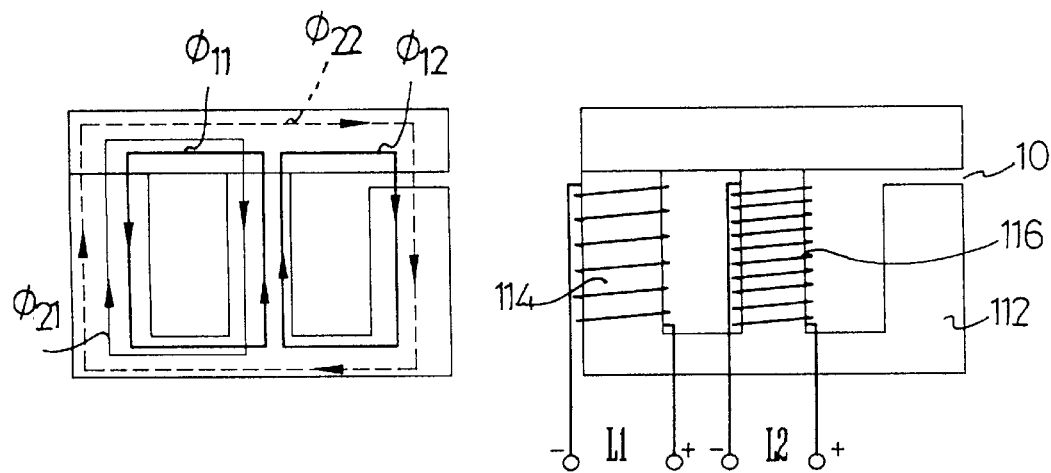
FIG. 9A shows the core in accordance with the present invention provided with both the magnetic saturation control coil and the linear compensation coil.
FIG. 9B shows the magnetic loop of FIG. 9A.

On the other hand, referring to FIGS. 9A and 9B, when the current $I_{L1}$ applied to the linear compensation coil L1 flows in a direction opposite to that of FIG. 8A (positive), at the left side of the core 100, the magnetic flux $\phi_{21}$ and $\phi_{22}$ induced by the linear compensation coil L1 flow in the direction opposite to the flow direction of the magnetic flux $\phi_{11}$ induced by the magnetic saturation control coil L2; while at the right side of the core 100, the magnetic flux $\phi_{22}$ induced by the coil L1 and the magnetic flux $\phi_{12}$ are in the same direction. Accordingly, the right side of the core 100 is more easily saturated than the left side thereof. However, because the right side of the core 100 has the gap 10, the magnetic resistance thereof is considerable, and therefore it cannot be saturated with the small current. Before the right side of the core 100 reaches the saturation point thereof, the current $I_{L1}$ increases as the current $I_{L2}$ applied to the coil L2 is being increased. This increase of current $I_{L1}$ is because the larger the current applied to the coil L2, the larger the magnetic flux $\phi_{12}$ becomes, and the right side of the core 100 approaches the saturation point thereof more, resulting in more flux being absorbed thereto, that is, magnetic flux $\phi_{11}$ becomes smaller and magnetic flux $\phi_{12}$ becomes even larger. Therefore, the resultant magnetic flux flows through the left side of the core 100 and hence the current $I_{L1}$ of the coil L1 is increased.

Figure 10:
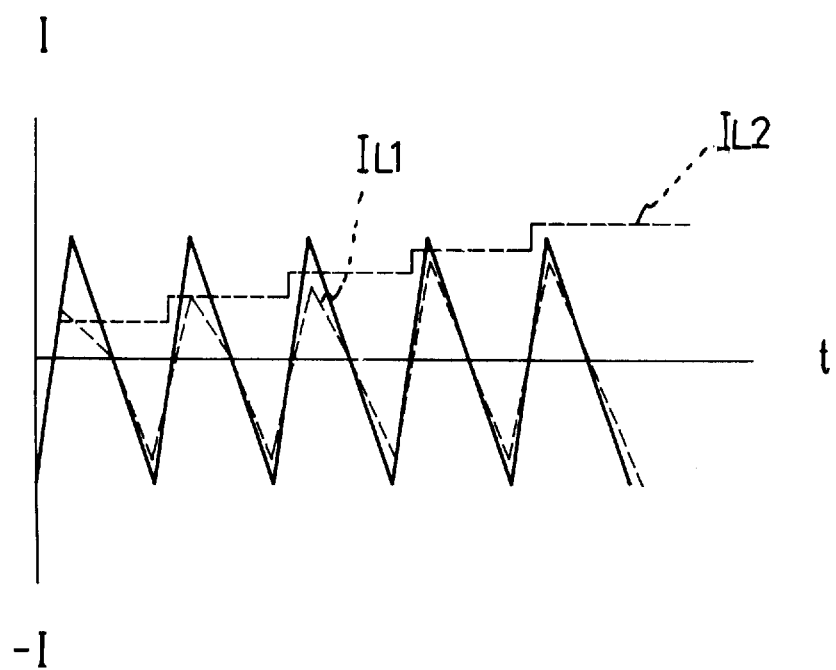
FIG. 10 shows the waveforms of the transformer in accordance with the present invention.

The relevant waveforms of the currents $I_{L1}$ and $I_{L2}$ flowing through the linear compensation coil L1 and the magnetic saturation control coil L2 are shown in FIG. 10. A solid line in FIG. 10 indicates the deflection current $I_D$ without any compensation. A substantially sawtooth-like dotted line indicates the current $I_{L1}$ of the linear compensation coil L1. The current $I_{L2}$ of the magnetic saturation control coil L2 is indicated by a step-like dotted line. As can be seen from FIG. 10, when the current $I_{L1}$ is negative, the current $I_{L1}$ and the deflection current $I_D$ vary in a substantially synchronous manner. When the current $I_{L1}$ is positive, the magnitude thereof is lower than that of the deflection current $I_D$. However, as the current $I_{L2}$ is being increased, the current $I_{L1}$ approaches to the deflection current $I_D$. Accordingly, as shown and described that the current $I_{L1}$ can be adjusted by varying the current $I_{L2}$, so as to attain different effects of compensation.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An adjustable asymmetric available saturation flux transformer in a horizontal deflection circuit of a multi-frequency display or cathode-ray tube, said horizontal deflection circuit having a deflection coil and said transformer comprising:

a core with no permanent magnet comprising a left side, a right side and an intermediate pole, said core having a gap defined in one of the left and right sides, wherein said core is a closed magnetic loop;

a linear compensation coil provided on one side of the core opposite to said side having said gap and connected with the deflection coil of the horizontal deflection circuit; and a magnetic saturation coil provided on the intermediate pole of the core and supplied with an adjustable current.

2. The transformer as claimed in claim 1, wherein said linear compensation coil is connected with the deflection coil of the horizontal deflection circuit in series.

3. The transformer as claimed in claim 1, wherein said core is composed of two portions, one portion of which having a section as an "E" and the other portion having a section as an "I".

4. The transformer as claimed in claim 1, wherein said core is composed of two portions, one portion of which having a section as an "E" and the other portion having a section as an inverse "E".

5. A horizontal deflection circuit in a multi-frequency display or cathode-ray tube comprising:

a deflection coil;

a linear compensation transformer, wherein said transformer comprises:

a core with no permanent magnet comprising a left side, a right side and an intermediate pole, said core having a gap defined in one of the left and right sides and constituting a closed magnetic loop;

a linear compensation coil provided on one side of said core opposite to said side having said gap and connected with said deflection coil of the horizontal deflection circuit;

a magnetic saturation coil provided on the intermediate pole of the core and supplied with an adjustable current; and a current control circuit that provides said adjustable current to said magnetic saturation coil and thereby provides compensation of a current in said deflection coil.

6. The horizontal deflection circuit as claimed in claim 5, wherein said linear compensation coil is connected with the deflection coil of the horizontal deflection circuit in series.

7. The horizontal deflection circuit as claimed in claim 5, wherein said core comprises at least two portions, one portion having a section as an "E" and another portion having a section as an "I".

8. The horizontal deflection circuit as claimed in claim 5, wherein said core comprises at least two portions, one portion having a section as an "E" and another portion having a section as an inverse "E".

9. A linear compensation transformer circuit for a horizontal deflection circuit in a multi-frequency display or cathode-ray tube, wherein the horizontal deflection circuit has a deflection coil, said transformer circuit comprising:

a core made of a single material and having no permanent magnet, comprising a left side, a right side and an intermediate pole, wherein said core has a gap defined in one of the left and right sides, and wherein said core defines a closed magnetic loop;

a linear compensation coil provided on one side of said core opposite to said side having said gap and connected with the deflection coil of the horizontal deflection circuit;

a magnetic saturation coil provided on the intermediate pole of the core and supplied with an adjustable current; and current control means for providing said adjustable current to said magnetic saturation coil to provide compensation adjustments of a current in said deflection coil of said horizontal deflection circuit.

10. The linear compensation transformer circuit as claimed in claim 9, wherein said linear compensation coil is connected with the deflection coil of the horizontal deflection circuit in series.

11. The linear compensation transformer circuit as claimed in claim 10, wherein said core comprises at least two portions, one portion having a section as an "E" and another portion having a section as an "I".

12. The linear compensation transformer circuit as claimed in claim 10, wherein said core comprises at least two portions, one portion having a section as an "E" and another portion having a section as an inverse "E".

13. The linear compensation transformer circuit as claimed in claim 9, wherein said core comprises at least two portions, one portion having a section as an "E" and another portion having a section as an "I".

14. The linear compensation transformer circuit as claimed in claim 9, wherein said core comprises at least two portions, one portion having a section as an "E" and another portion having a section as an inverse "E".

15. The linear compensation transformer circuit as claimed in claim 9, wherein said current control means includes a variable resistor and a transistor.

* * * * *